United States Patent Office 3,557,539
Patented Jan. 26, 1971

3,557,539
DEVICE FOR SHAKING DOWN FRUIT, IN PARTICULAR MACHINES FOR COLLECTING BERRY FRUITS
Kalman Lammel and Erno Horvath, Budapest, Hungary, assignors to Mezogazdasagi Gepjavito Vallalat, Paszto, Hungary
Filed June 18, 1968, Ser. No. 737,922
Claims priority, application Hungary, June 23, 1967, LA–657
Int. Cl. A01g 19/06
U.S. Cl. 56—330                                            5 Claims

ABSTRACT OF THE DISCLOSURE

A vehicle-mounted machine for gathering fruit from fruit bushes carries to one side a deflector having a curved surface the forward part of which is upright and the rear part of which is horizontal and directed toward the vehicle. The curved surface is comprised by a plurality of resilient wires; and a vibrator acts on the lower end of the wires, or acts on the bushes between the wires, to shake loose the fruit into a subjacent collecting vessel.

---

Figure 1:
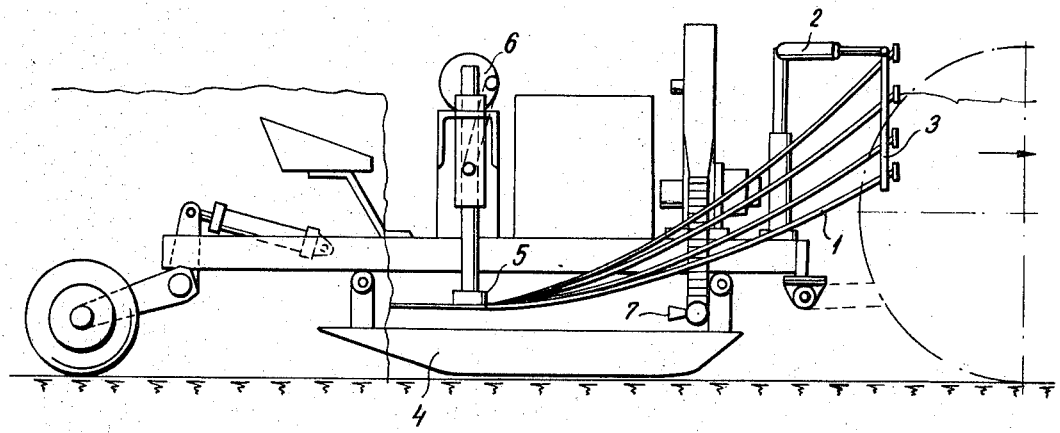

Berry fruits are greatly in demand, but their large-scale cultivation is considerably hampered by the large amount of hand-work required for picking. A hand-picker's daily performance, for example in raspberries, amounts to an average of only 20 kg., which means that some 40 manual workdays are necessary for picking the crop of an acre of raspberries. Considering the fact that the period of picking is also very limited—not more than 20 days in the case of raspberries—it is practically impossible to find manual pickers for large-scale cultivation.

Accordingly, the mechanisation of picking and thus the reduction of manual labor constitutes an important problem, the solution of which would not only cut down the costs but would permit to enlarge the area where berry fruits are grown, since the hitherto unsolved problem of finding a sufficiently large number of pickers during the summer season, could thus be eliminated. Another advantage of mechanising this work is, beside increasing the crop per person, the lessening of losses due to fallen-off fruit.

Various machines or implements are already known for the purpose of mechanised picking of berry fruit, based on different principles, such as shaking, cutting off or rapping (beating) the fruit-bearing branches.

In one of the most widely used machines the branches are shaken with the aid of a manually activated vibrating device, and the berries are taken up on canvas or some other cloth placed below the bushes. By means of this device, however, the crop per person can only be raised to two or threefold of what can be picked manually, with only a very slight reduction of the costs.

The machines cutting off the fruit-bearing branches with subsequent removal of the berries have not solved the problem either. Here again, the daily production was hardly increased, and no substantial reduction of cost was experienced. Another shortcoming was that this method did not consider the requirement of the varying ripening times of the raspberry, and the amount of berries picked decreased.

The machines which have the working principle of beating or rapping the branches are voluminous, automotive machines, their under-carriages extending over the rows of bushes. These machines involve the risk of damaging the adjacent bushes, and no provision is made for collecting the produce. In addition, these machines are very expensive.

The machine according to the invention eliminates all the disadvantages listed above, while enabling rapid, complete and unharmed removal of all the ripe berries from the branches or stalks. To this end, the machine is provided with a bracket extending from the undercarriage of the fruit-collecting machine, said bracket consisting of a horizontal beam which is normal to the travelling direction of the machine, and a vertical rod; there is furthermore disposed on the undercarriage a support which is connected with a vibrator and also extends normal to the traveling direction, said rod and support being connected to a surface extending over a collecting vessel.

The invention is more fully described with reference to the accompanying drawing illustrating a preferable embodiment of the machine according to the invention by way of example.

Figure 2:
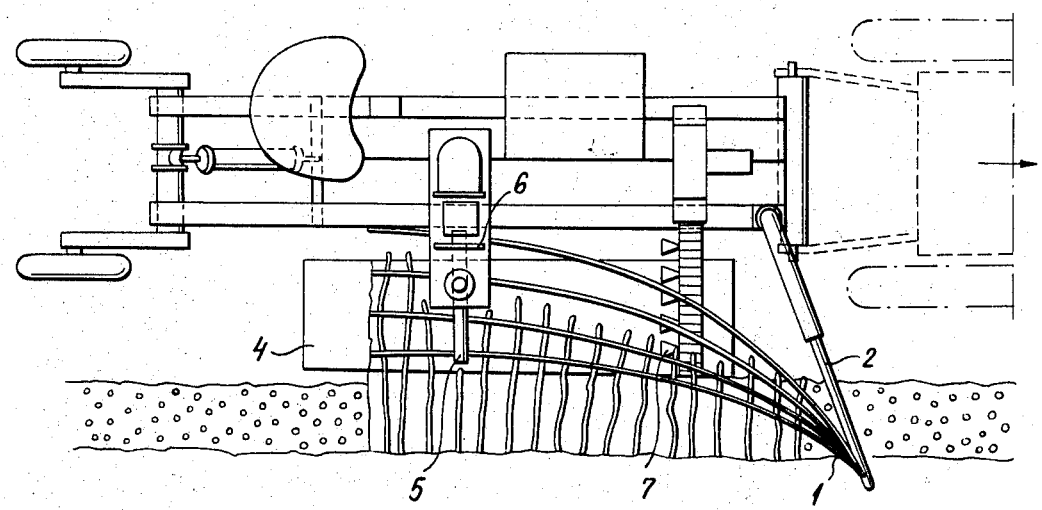

FIG. 1 shows a side view, and
FIG. 2 a plan view of the machine according to the invention.

Wires 1 are disposed along a surface bent in two directions, consequently having a double spatial curvature. Said wires are connected on the one hand to a vertical rod 3 mounted on the end of a bracket 2 or adjustable length extending over the row of bushes, and on the other hand to a substantially horizontal support 5 positioned over a collecting vessel 4, and coupled to a vibrator 6. By means of the wires 1 the branches of the plant are guided over the collecting vessel 6 in scuh a manner that the upright branches (designated on the right side of FIG. 2 by small circles) are bent sidewards, so that these branches are bent towards the machine, which position is indicated in FIG. 2 by wavy lines.

Since the vibrator 6 keeps the extremities of the elastic wires 1 vibrating, vibrating motion is also imparted to the branches bent into horizontal position and pressed from below to the wires. Accordingly, the vibrator 6 permits to produce a vibrating or shaking motion of the fruit branches in such a manner that the amplitude and frequency of the vibration can be adjusted so as to separate the ripe berries from the branches with the utmost efficiency.

An air-blasting device 7 is provided for removing such undesired portions of the plant and other impurities which might otherwise fall into the collecting vessel 4.

Instead of wires, a continuous surface may be provided, bending the branches downwards and towards the machine, but wires have been found to be more elastic and therefore preferable.

When the machine moves on, the branches recover their original upright position due to their elasticity. This has been shown in FIG. 2 by small circles indicating the top level of the upright branches both on the right side, prior to bending, and on the left side, where the branches have recovered their upright position after they had been bent. The front part of the curved surface along which the wires 1 are disposed (viewed in the direction of travelling) is vertical, and farther remote from the machine than the back part of said surface which lies in a horizontal position.

The front part of the machine is suspended—in the illustrated embodiment—from a tractor, and the back part is supported by two wheels.

If it is intended to direct the vibrating motion precisely over the collecting vessel 4, one can resort to rigid wires instead of elastic wires. Such rigid wires are fixed (not coupled to the vibrator), but the lower part of the vibrator extends from above between two adjacent wires and in this manner reaches the branches to be shaken or vibrated.

For manipulating the machine not more than two persons are required, including the driver of the tractor, but if the machine is automotive, one person is sufficient.

In this case the production is forty times a hand picker's production.

What we claim is:

1. A machine for shaking fruit from bushes, comprising a frame, means for moving the frame along the ground, means carried by the frame on one side of the frame defining a curved surface having an upright forward portion and a horizontal rear portion with said surface veering from said upright portion rearwardly to said horizontal portion in the direction of the frame, a vibrator carried by said frame to shake bent branches adjacent said horizontal portion, and a collecting vessel carried by the frame beneath said vibrator to collect fruit shaken from the bushes.

2. A machine as claimed in claim 1, said surface-defining means comprising a plurality of spaced wires.

3. A machine as claimed in claim 2, and an upright rod which is carried by said frame and to which the upper forward ends of said wires are connected, and a horizontal beam which is carried by said frame and to which the lower rear ends of said wires are connected.

4. A machine as claimed in claim 3, said vibrator being connected to said beam to vibrate said beam.

5. A machine as claimed in claim 3, said vibrator acting on said bushes between said wires.

References Cited

UNITED STATES PATENTS

| | | | |
|---|---|---|---|
| 1,278,175 | 9/1918 | Le Baron | 56—330 |
| 2,925,687 | 2/1960 | Pronio et al. | 56—328 |
| 3,105,344 | 10/1963 | Anderson et al. | 56—328 |
| 3,269,099 | 8/1966 | Fricks | 56—328 |
| 3,413,789 | 12/1968 | Studer | 56—330 |
| 3,466,859 | 9/1969 | Humphries | 56—327 |

FOREIGN PATENTS

| | | | |
|---|---|---|---|
| 1,379,506 | 10/1964 | France | 56—328 |
| 1,380,941 | 10/1964 | France | 56—330 |

LOUIS G. MACENE, Primary Examiner

J. N. ESKOVITZ, Assistant Examiner